(12) United States Patent
Kusabe et al.

(10) Patent No.: US 9,845,870 B2
(45) Date of Patent: Dec. 19, 2017

(54) LOCK-UP CLUTCH CONTROL DEVICE AND CONTROL METHOD

(71) Applicant: AISIN AW CO., LTD., Anjo-shi, Aichi-ken (JP)

(72) Inventors: Keiichirou Kusabe, Anjo (JP); Yasuhiko Kobayashi, Anjo (JP); Jin Izawa, Obu (JP)

(73) Assignee: AISIN AW CO., LTD., Anjo (JP)

( * ) Notice: Subject to any disclaimer, the term of this patent is extended or adjusted under 35 U.S.C. 154(b) by 292 days.

(21) Appl. No.: 14/654,327

(22) PCT Filed: Jan. 17, 2014

(86) PCT No.: PCT/JP2014/050856
§ 371 (c)(1),
(2) Date: Jun. 19, 2015

(87) PCT Pub. No.: WO2014/112606
PCT Pub. Date: Jul. 24, 2014

(65) Prior Publication Data
US 2015/0330505 A1    Nov. 19, 2015

(30) Foreign Application Priority Data
Jan. 18, 2013   (JP) .................................. 2013-007881

(51) Int. Cl.
*F16H 61/14*    (2006.01)
(52) U.S. Cl.
CPC ........... *F16H 61/143* (2013.01); *F16H 61/14* (2013.01); *F16H 2061/145* (2013.01)

(58) Field of Classification Search
CPC ... F16H 61/14; F16H 61/143; F16H 2061/145
See application file for complete search history.

(56) References Cited

U.S. PATENT DOCUMENTS

| 4,724,939 A * | 2/1988 | Lockhart ............... F16H 61/143 192/103 F |
| 4,725,951 A | 2/1988 | Niikura |
| 2004/0102289 A1* | 5/2004 | Aikawa ................. F16H 61/061 477/176 |

(Continued)

FOREIGN PATENT DOCUMENTS

| JP | S59180156 A | 10/1984 |
| JP | S601458 A | 1/1985 |

(Continued)

OTHER PUBLICATIONS

Feb. 18, 2014 International Search Report issued in International Application No. PCT/JP2014/050856.

*Primary Examiner* — Jacob S Scott
(74) *Attorney, Agent, or Firm* — Oliff PLC

(57) ABSTRACT

A lock-up clutch control device that sets a hydraulic pressure command value for a lock-up clutch as a starting device together with a pump impeller coupled to a motor of a vehicle and a turbine runner coupled to an input shaft of a transmission such that an actual rotational speed difference between the motor and the input shaft coincides with a target slip speed that matches a state of the vehicle, and that controls the lock-up clutch based on the hydraulic pressure command value.

13 Claims, 7 Drawing Sheets

(56) References Cited

U.S. PATENT DOCUMENTS

| | | | |
|---|---|---|---|
| 2005/0121277 A1* | 6/2005 | Segawa | F16H 61/143 192/3.3 |
| 2005/0192133 A1* | 9/2005 | Oshiumi | F16H 61/66272 474/18 |
| 2005/0278103 A1* | 12/2005 | Higashimata | F16H 61/143 701/67 |
| 2009/0247363 A1* | 10/2009 | Nagami | F16D 48/066 477/181 |
| 2011/0245034 A1* | 10/2011 | Yoshida | B60K 6/48 477/8 |

FOREIGN PATENT DOCUMENTS

| | | |
|---|---|---|
| JP | S6049160 A | 3/1985 |
| JP | S60143265 A | 7/1985 |
| JP | S60143267 A | 7/1985 |
| JP | S60143268 A | 7/1985 |
| JP | 2010-270822 A | 12/2010 |

* cited by examiner

LOCK-UP CLUTCH CONTROL DEVICE AND CONTROL METHOD

BACKGROUND

The present disclosure relates to a lock-up clutch control device and control method capable of coupling and decoupling a motor of a vehicle and an input shaft of a transmission to and from each other.

Hitherto, there has been known a control device that performs slip control in which the actual slip speed (actual rotational speed difference) between a motor and an input shaft of a transmission is caused to coincide with a target slip speed, including: a first feedback compensator (proportional-differential (PD) controller) that has a frequency characteristic in which the gain of low-frequency area of deviation between target slip rotation and actual slip rotation is set smaller than the gain of high-frequency area and that inputs the deviation and outputs a first slip rotation command value; and a second feedback compensator (proportional-integral-differential (PID) controller) that has a frequency characteristic in which the gain of low-frequency area of the deviation is set larger than the gain of high-frequency area and that inputs the deviation and outputs a second slip rotation command value (see Japanese Patent Application Publication No. 2010-270822, for example).

In order to improve the transient response characteristics of slip control during starting of the vehicle, the control device switches from feedback control by the first feedback compensator to feedback control by the second feedback compensator in accordance with the magnitude of a delay in response of a clutch hydraulic pressure, that is, the control amount for deciding the torque capacity of a lock-up clutch, during starting of the vehicle. Then, in switching between the feedback compensators, the assignment of weights to the first slip rotation command value and the second slip rotation command value with respect to a slip rotation command value is gradually varied. As the control amount for deciding the torque capacity of the lock-up clutch, the pressure difference between an application pressure and a release pressure that act on the lock-up clutch, the torque capacity of the lock-up clutch estimated from the engine torque and the engine rotational speed, or the like is used. In addition, Japanese Patent Application Publication No. 2010-270822 also describes use of a map in which regions for switching between the feedback control by the first feedback compensator and the feedback control by the second feedback compensator using the engine torque and the engine rotational speed as arguments are prescribed in advance.

SUMMARY

If the slip control discussed above is executed in a wide rotation range, not only in a rotation range in which the engine rotational speed is relatively low such as during starting of the vehicle, the efficiency of power transfer via the lock-up clutch and the fuel efficiency of the engine (motor) can be improved. However, the characteristics of the lock-up clutch to be controlled are varied continuously in accordance with the state etc. of the vehicle or the engine. Therefore, in the control device described in Japanese Patent Application Publication No. 2010-270822, the characteristics (gain) of the first and second feedback compensators themselves are not varied even if switching is performed between the feedback control by the first feedback compensator and the feedback control by the second feedback compensator in accordance with the state etc. of the vehicle or the engine or the assignment of weights to the first slip rotation command value and the second slip rotation command value is gradually varied in accordance with the state etc. of the vehicle or the like. Moreover, it is not easy to adequately vary the assignment of weights in accordance with the state etc. of the vehicle or the like, and thus it is difficult to improve the response of the slip control while stably executing the slip control.

It is therefore a main object of the present disclosure to execute slip control stably and responsively in a wide execution region.

The present disclosure according to an exemplary embodiment provides a lock-up clutch control device that sets a hydraulic pressure command value for a lock-up clutch that constitutes a starting device together with a pump impeller coupled to a motor of a vehicle and a turbine runner coupled to an input shaft of a transmission such that an actual rotational speed difference between the motor and the input shaft coincides with a target slip speed that matches a state of the vehicle, and that controls the lock-up clutch on the basis of the hydraulic pressure command value, the lock-up clutch control device including an electronic control unit that is programmed to:

acquire a rotational speed of the input shaft; and
set a feedback term of the hydraulic pressure command value including at least a proportional term and an integral term using at least a difference between the target slip speed and the actual rotational speed difference, a proportional term gain, and an integral term gain, in which
at least the integral term gain is changed in accordance with a rotational speed of the input shaft.

The lock-up clutch control device controls a lock-up clutch that constitutes a starting device together with a pump impeller coupled to a motor of a vehicle and a turbine runner coupled to an input shaft of a transmission. The electronic control unit is further programmed to set a feedback term of a hydraulic pressure command value including at least a proportional term and an integral term using at least a difference between the target slip speed and the actual rotational speed difference, a proportional term gain, and an integral term gain, and executes slip control in which the actual rotational speed difference between the motor and the input shaft of the transmission is caused to coincide with the target slip speed using the hydraulic pressure command value including the feedback term.

The inventors conducted diligent studies in order for such a control device to be able to execute the slip control stably and responsively in a wide execution region, and focused on the fact that a reaction force that matches the rotational speed of the input shaft acts from the side of the input shaft of the transmission, that is, the side of the turbine runner, against power from the motor during execution of the slip control on the lock-up clutch which is combined with a fluid transmission device such as a fluid coupling and a torque converter including a pump impeller and a turbine runner. Then, as a result of the studies, the inventors found that the amount of variations in the hydraulic pressure command value required to vary the actual rotational speed difference by a certain amount fluctuates in accordance with fluctuations in the reaction force which acts from the side of the input shaft against power from the motor, that is, fluctuations in the rotational speed of the input shaft, and configured the lock-up clutch control device such that at least the integral term gain in the feedback term is changed in accordance with the rotational speed of the input shaft. Consequently, it is possible to adequately set the hydraulic pressure command value such that a desired actual rotational speed difference can be obtained by bringing at least the integral term gain to a value that matches the rotational speed of the input shaft even if the rotational speed of the input shaft of the transmission fluctuates in executing the slip control. Thus, with the control device, it is possible to execute the slip control stably and responsively in a wide execution region (rotational speed range). The state of the motor may be included in the "state of the vehicle".

In the control device, in addition, at least the integral term gain may be set to a larger value as the rotational speed of the input shaft is higher. That is, the reaction force which acts from the side of the input shaft (turbine runner) against power from the motor is generally proportional to the square value of the rotational angle speed of the input shaft. As the rotational speed of the input shaft is higher, the reaction force is larger, and thus the amount of variations in the torque capacity of the lock-up clutch required to vary the actual rotational speed difference by a certain amount through the slip control is larger. Thus, in order to vary the actual rotational speed difference by a certain amount through the slip control, it is necessary to increase the amount of variations in the hydraulic pressure command value as the rotational speed of the input shaft at the time of execution of the slip control is higher. Consequently, by setting at least the integral term gain to a larger value as the rotational speed of the input shaft is higher (to a smaller value as the rotational speed of the input shaft is lower), it is possible to improve the stability of the slip control by suppressing abrupt engagement of the lock-up clutch in the case where the rotational speed of the input shaft is relatively low, and to improve the response of the lock-up clutch to the hydraulic pressure command value in the case where the rotational speed of the input shaft is relatively high.

Further, the control device may further include the electronic control unit that is further programmed to acquire a temperature of working oil that actuates the lock-up clutch, and at least the integral term gain may be further changed in accordance with the temperature of the working oil. In the course of the studies discussed above, the inventors also focused on the temperature of working oil that actuates the lock-up clutch in executing the slip control. Then, the inventors found that the amount of variations in the hydraulic pressure command value required to vary the actual rotational speed difference by a certain amount also fluctuates in accordance with fluctuations in the temperature of working oil, and configured the lock-up clutch control device such that at least the integral term gain in the feedback term is further changed in accordance with the temperature of working oil. Consequently, by bringing at least the integral term gain to a value that matches the temperature of working oil even if the temperature of working oil varies in executing the slip control, it is possible to adequately set the hydraulic pressure command value such that a desired actual rotational speed difference can be obtained, which makes it possible to execute the slip control stably and responsively in various situations.

In the control device, in addition, at least the integral term gain may be set to a larger value as the temperature of the working oil is higher. That is, as the temperature of working oil is higher, the friction coefficient of the friction material is smaller because of a reduction in the viscosity of the working oil. Thus, the amount of variations in the friction force, that is, the torque capacity, of the lock-up clutch at the time when the hydraulic pressure command value is varied by a certain amount is smaller, and accordingly the amount of variations in the actual rotational speed difference at the time when the hydraulic pressure command value is varied by a certain amount is also smaller. Thus, in order to vary the actual rotational speed difference by a certain amount through the slip control, it is necessary to increase the amount of variations in the hydraulic pressure command value as the temperature of working oil at the time of execution of the slip control is higher. Consequently, by setting at least the integral term gain to a larger value as the temperature of working oil is higher (to a smaller value as the temperature of working oil is lower), it is possible to improve the stability of the slip control by suppressing abrupt engagement of the lock-up clutch in the case where the temperature of working oil is relatively low, and to improve the response of the lock-up clutch to the hydraulic pressure command value in the case where the temperature of working oil is relatively high.

In the control device, further, at least the integral term gain may be further changed in accordance with the actual rotational speed difference. In the course of the studies discussed above, the inventors also focused on the actual rotational speed difference between the motor and the input shaft of the transmission at the time of execution of the slip control. Then, the inventors found that the amount of variations in the hydraulic pressure command value required to vary the actual rotational speed difference by a certain amount also fluctuates in accordance with the actual rotational speed difference itself, and configured the lock-up clutch control device such that at least the integral term gain in the feedback term is further changed in accordance with the actual rotational speed difference. Consequently, by bringing at least the integral term gain to a value that matches the actual rotational speed difference when the actual rotational speed difference between the motor and the input shaft of the transmission varies along with execution of the slip control, it is possible to adequately set the hydraulic pressure command value such that a desired actual rotational speed difference can be obtained, which makes it possible to execute the slip control stably and responsively in various situations.

In the control device, in addition, at least the integral term gain may be set to a larger value as the actual rotational speed difference is smaller. That is, as the actual rotational speed difference between the motor and the input shaft of the transmission is smaller, the friction coefficient of the friction material is smaller. Thus, the amount of variations in the friction force, that is, the torque capacity, of the lock-up clutch at the time when the hydraulic pressure command value is varied by a certain amount is smaller, and accordingly the amount of variations in the actual rotational speed difference at the time when the hydraulic pressure command value is varied by a certain amount is also smaller. Thus, in order to vary the actual rotational speed difference by a certain amount through the slip control, it is necessary to increase the amount of variations in the hydraulic pressure command value as the actual rotational speed difference at the time of execution of the slip control is smaller. Consequently, by setting at least the integral term gain to a larger value as the actual rotational speed difference is smaller (to a smaller value as the actual rotational speed difference is larger), it is possible to improve the delay in response of the lock-up clutch in the case where the actual rotational speed difference is relatively small, and to improve the stability of the slip control by suppressing abrupt engagement of the lock-up clutch in the case where the actual rotational speed difference is relatively large.

In the control device, further, each of the integral term gain and the proportional term gain may be changed in accordance with the rotational speed of the input shaft. In this way, by individually setting the proportional term gain and the integral term gain to values that match the rotational speed of the input shaft, it is possible to adequately set the hydraulic pressure command value such that a desired actual rotational speed difference can be obtained even if the rotational speed of the input shaft of the transmission fluctuates in executing the slip control, and to immediately converge the actual rotational speed difference between the motor and the input shaft to the target slip speed.

In addition, the control device may include a proportional term gain setting map that prescribes a relationship between the rotational speed of the input shaft, the temperature of the working oil, and the actual rotational speed difference and the proportional term gain and an integral term gain setting map that prescribes a relationship between the rotational speed of the input shaft, the temperature of the working oil, and the actual rotational speed difference and the integral term gain, and may derive the proportional term gain corresponding to the rotational speed of the input shaft, the temperature of the working oil, and the actual rotational speed difference from the proportional term gain setting map, and derive the integral term gain corresponding to the rotational speed of the input shaft, the temperature of the working oil, and the actual rotational speed difference from the integral term gain setting map. Consequently, it is possible to individually bring the proportional term gain and the integral term gain to adequate values that match the rotational speed of the input shaft, the temperature of working oil, and the actual rotational speed difference, which makes it possible to set the hydraulic pressure command value extremely adequately such that a desired actual rotational speed difference can be obtained.

Further, the pump impeller and the turbine runner may constitute a torque converter together with a stator that rectifies a flow of the working oil from the turbine runner to the pump impeller. That is, in the case where the lock-up clutch is combined with the torque converter which includes the pump impeller, the turbine runner, and the stator, the reaction force which acts from the side of the input shaft (turbine runner) against power from the motor in executing the slip control is particularly large. Thus, the present disclosure is extremely suitable for a lock-up clutch that constitutes a starting device of a vehicle together with a torque converter that includes a pump impeller, a turbine runner, and a stator.

The present disclosure according to an exemplary embodiment also provides a lock-up clutch control method by which a hydraulic pressure command value for a lock-up clutch that constitutes a starting device together with a pump impeller coupled to a motor of a vehicle and a turbine runner coupled to an input shaft of a transmission is set such that an actual rotational speed difference between the motor and the input shaft coincides with a target slip speed that matches a state of the vehicle, and by which the lock-up clutch is controlled on the basis of the hydraulic pressure command value, including:

(a) a step of acquiring a rotational speed of the input shaft;

(b) a step of changing at least an integral term gain in a feedback term of the hydraulic pressure command value in accordance with the rotational speed of the input shaft acquired in step (a); and (c) a step of setting a feedback term of the hydraulic pressure command value including at least a proportional term and an integral term using at least a difference between the target slip speed and the actual rotational speed difference, the proportional term gain, and the integral term gain.

With the method, it is possible to adequately set the hydraulic pressure command value such that a desired actual rotational speed difference can be obtained by bringing at least the integral term gain to a value that matches the rotational speed of the input shaft even if the rotational speed of the input shaft of the transmission fluctuates in executing the slip control. Thus, with the method, it is possible to execute the slip control stably and responsively in a wide execution region (rotational speed range).

In addition, the step (b) may include setting at least the integral term gain to a larger value as the rotational speed of the input shaft is higher.

DETAILED DESCRIPTION OF THE EMBODIMENTS

Now, an embodiment of the present disclosure will be described with reference to the drawings.

Figure 1:
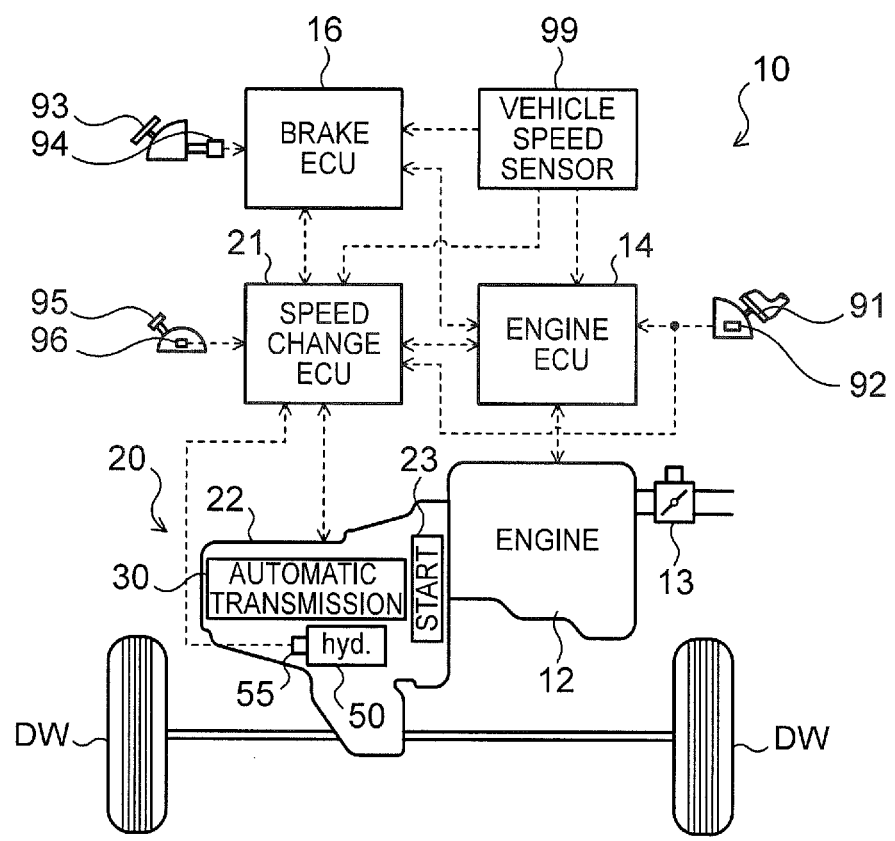
FIG. 1 illustrates a schematic configuration of an automobile which is a vehicle including a lock-up clutch control device according to the present disclosure.

FIG. 1 illustrates a schematic configuration of an automobile 10 which is a vehicle including a lock-up clutch control device according to the present disclosure. The automobile 10 illustrated in the drawing includes: an engine (internal combustion engine) 12 that serves as a motor that outputs power through explosive combustion of a mixture of a hydrocarbon fuel, such as gasoline and light oil, and air; an engine electronic control unit (hereinafter referred to as an "engine ECU") 14 that controls the engine 12; a brake electronic control unit (hereinafter referred to as a "brake ECU") 16 that controls an electronically controlled hydraulic brake unit (not illustrated); a power transfer device 20 connected to the engine 12 to transfer power from the engine 12 to left and right drive wheels DW; and so forth. The power transfer device 20 has a transmission case 22, a starting device 23, a stepped automatic transmission 30, a hydraulic control device 50, and a speed change electronic control unit (hereinafter referred to as a "speed change ECU") 21 that controls such components.

The engine ECU 14 is structured as a microcomputer including a CPU (not illustrated) as a main component, and has a ROM that stores various programs, a RAM that temporarily stores data, input and output ports and a communication port (not illustrated), and so forth besides the CPU. As illustrated in FIG. 1, the engine ECU 14 receives inputs such as an accelerator operation amount Acc from an accelerator pedal position sensor 92 that detects the amount of depression (amount of operation) of an accelerator pedal 91, a vehicle speed V from a vehicle speed sensor 99, signals from various sensors such as a crankshaft position sensor (not illustrated) that detects the rotational position of a crankshaft 15 (see FIG. 2), and signals from the brake ECU 16 and the speed change ECU 21. The engine ECU 14 controls an electronically controlled throttle valve 13, and a fuel injection valve, an ignition plug, and so forth (not illustrated) on the basis of the received signals. In addition, the engine ECU 14 calculates a rotational speed Ne of the engine 12 on the basis of the rotational position of the crankshaft 15 detected by the crankshaft position sensor. Further, the engine ECU 14 calculates engine torque Te, which is an estimated value of torque output from the engine 12, on the basis of the rotational speed Ne, the intake air amount of the engine 12 detected by an air flow meter (not illustrated) or a throttle operation amount THR of the throttle valve 13, and a map or calculation formula determined in advance, for example.

The brake ECU 16 is also structured as a microcomputer including a CPU (not illustrated) as a main component, and has a ROM that stores various programs, a RAM that temporarily stores data, input and output ports and a communication port (not illustrated), and so forth besides the CPU. As illustrated in FIG. 1, the brake ECU 16 receives inputs such as a master cylinder pressure detected by a master cylinder pressure sensor 94 when a brake pedal 93 is depressed, the vehicle speed V from the vehicle speed sensor 99, signals from various sensors (not illustrated), and signals from the engine ECU 14 and the speed change ECU 21. The brake ECU 16 controls a brake actuator (hydraulic actuator) (not illustrated) etc. on the basis of the received signals.

The speed change ECU 21 which controls the power transfer device 20 is also structured as a microcomputer including a CPU (not illustrated) as a main component, and includes a ROM that stores various programs, a RAM that temporarily stores data, input and output ports and a communication port (not illustrated), and so forth besides the CPU. As illustrated in FIG. 1, the speed change ECU 21 receives inputs such as the accelerator operation amount Acc from the accelerator pedal position sensor 92, the vehicle speed V from the vehicle speed sensor 99, a shift range SR from a shift range sensor 96 that detects the operation position of a shift lever 95 for selecting a desired shift range from a plurality of shift ranges, signals from various sensors such as an oil temperature sensor 55 that detects an oil temperature Toil of working oil of the hydraulic control device 50 and a rotational speed sensor 33 (see FIG. 2) that detects an input rotational speed Nin of the automatic transmission 30 (the rotational speed of a turbine runner 25 or an input shaft 31 of the automatic transmission 30), a signal from the engine ECU 14 that indicates the rotational speed Ne of the engine 12, the engine torque Te, etc., a signal from the brake ECU 16, and so forth. The speed change ECU 21 controls the starting device 23 and the automatic transmission 30, that is, the hydraulic control device 50, on the basis of the received signals.

Figure 2:
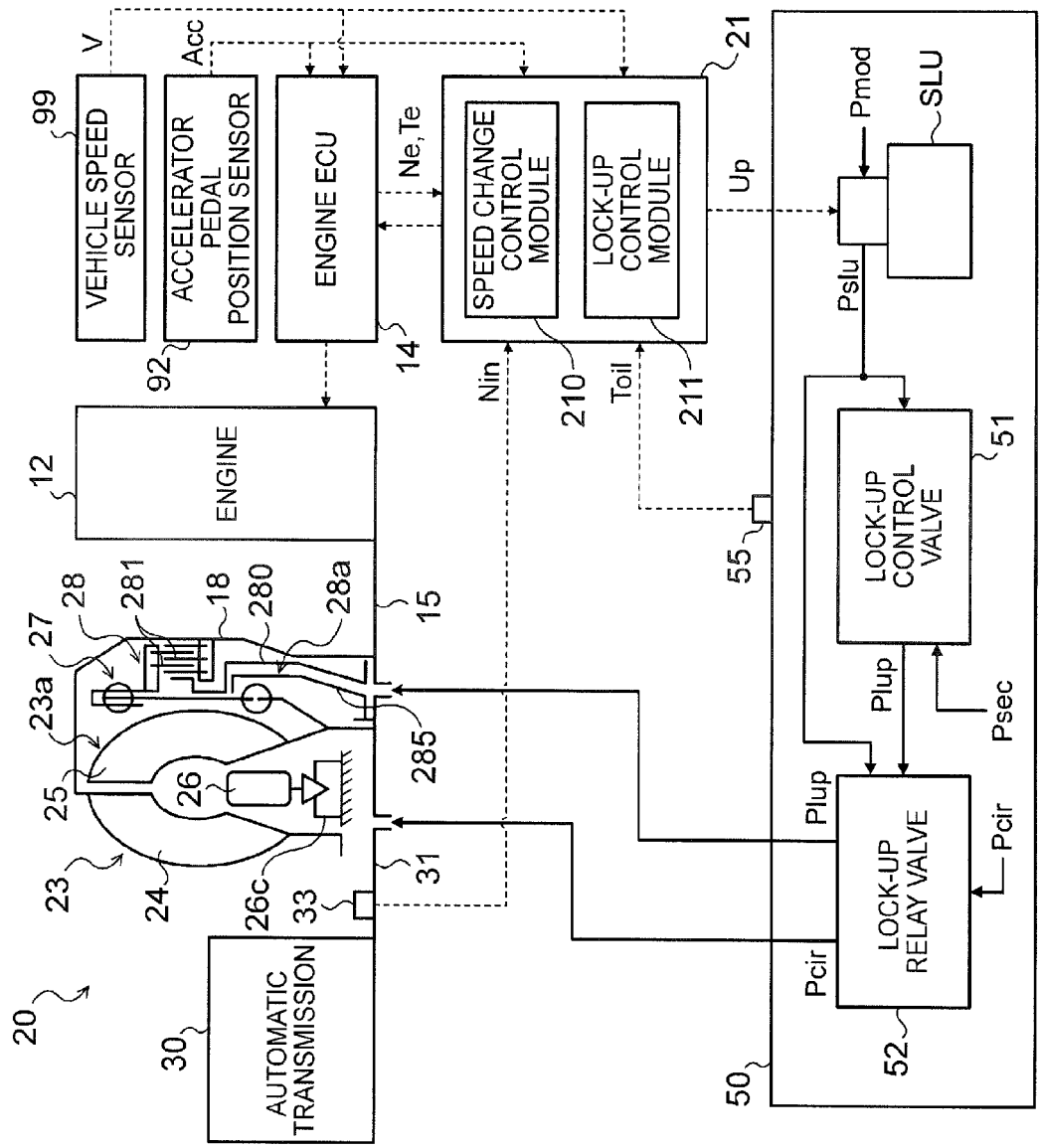
FIG. 2 illustrates a schematic configuration of a power transfer device including a lock-up clutch.

As illustrated in FIG. 2, the starting device 23 included in the power transfer device 20 includes: a pump impeller 24 that serves as an input-side fluid transmission element coupled to the crankshaft 15 of the engine 12 via a front cover 18 that serves as an input member; a turbine runner 25 that serves as an output-side fluid transmission element fixed to the input shaft 31 of the automatic transmission 30 via a turbine hub; a stator 26 disposed inside the pump impeller 24 and the turbine runner 25 to rectify the flow of working oil from the turbine runner 25 to the pump impeller 24; a one-way clutch 26c that restricts rotation of the stator 26 to one direction; a damper mechanism 27 coupled to the turbine hub; a lock-up clutch 28 that serves as a hydraulic starting clutch; and so forth.

The pump impeller 24, the turbine runner 25, and the stator 26 constitute a torque converter, and function as a torque amplifier through the action of the stator 26 when the rotational speed difference between the pump impeller 24 and the turbine runner 25 is large, and function as a fluid coupling when the rotational speed difference between the pump impeller 24 and the turbine runner 25 is small. It should be noted, however, that the starting device 23 is not provided with the stator 26 and the one-way clutch 26c so that the pump impeller 24 and the turbine runner 25 function as a fluid coupling. In addition, the damper mechanism 27 includes an input element coupled to the lock-up clutch 28, an intermediate element coupled to the input element via a plurality of first elastic members, an output element coupled to the intermediate element via a plurality of second elastic members and fixed to the turbine hub, and so forth, for example. The damper mechanism 27 damps vibration between the front cover 18 and the turbine hub (input shaft 31) when the lock-up clutch 28 is engaged.

The lock-up clutch 28 selectively establishes and releases lock-up in which the pump impeller 24 and the turbine runner 25, that is, the engine 12 (front cover 18) and the input shaft 31 of the automatic transmission 30 fixed to the turbine hub, are mechanically coupled to each other (via the damper mechanism 27). In the embodiment, the lock-up clutch 28 is constituted as a hydraulic multi-plate friction clutch, and includes a lock-up piston 280 supported by the front cover 18 so as to be movable in the axial direction, a plurality of friction engagement plates 281, and an annular flange member (oil chamber defining member) 285.

The plurality of friction engagement plates 281 includes mating plates fitted with a clutch hub fixed to the front cover 18, and friction plates having a friction material and fitted with a clutch drum coupled to the input element of the damper mechanism 27. The flange member 285 is fixed with respect to the front cover 18 so as to be positioned on the side of the damper mechanism 27 with respect to the lock-up piston 280, and defines an engagement oil chamber 28a together with the lock-up piston 280. The lock-up clutch 28 is engaged by moving the lock-up piston 280 toward the front cover 18 such that the plurality of friction engagement plates are brought into press contact with each other by increasing the hydraulic pressure in the engagement oil chamber 28a. The lock-up clutch 28 may be constituted as a hydraulic single-plate friction clutch that includes a lock-up piston to which a friction material is affixed.

The automatic transmission 30 can transfer power transferred to the input shaft 31 to an output shaft (not illustrated) while changing among a plurality of shift speeds, and includes a plurality of planetary gear mechanisms, a plurality of clutches, brakes, and one-way clutches for changing the power transfer path from the input shaft 31 to the output shaft, and so forth. The output shaft of the automatic transmission 30 is coupled to the drive wheels DW via a gear mechanism and a differential mechanism (not illustrated). The plurality of clutches and brakes are engaged and disengaged by a hydraulic pressure from the hydraulic control device 50. The automatic transmission 30 may be constituted as a so-called continuously variable transmission.

In order to generate a hydraulic pressure for the starting device 23 and the automatic transmission 30, the hydraulic control device 50 includes: a primary regulator valve that regulates the pressure of working oil from an oil pump (not illustrated) driven by power from the engine 12 to generate a line pressure PL; a secondary regulator valve that regulates a drain pressure of the primary regulator valve, for example, to generate a secondary pressure Psec; a modulator valve that regulates the line pressure PL to generate a constant modulator pressure Pmod; a linear solenoid valve that regulates the modulator pressure Pmod, for example, in accordance with the accelerator operation amount Acc or the operation amount THR of the throttle valve 13 to generate a signal pressure for the primary regulator valve; a manual valve that can supply working oil to the plurality of clutches and brakes of the automatic transmission 30 in accordance with the operation position of the shift lever 95; a plurality of linear solenoid valves that can each regulate the pressure of working oil (at the line pressure PL) from the manual valve to output the regulated pressure to a corresponding one of the clutches and the brakes; and so forth (not illustrated).

In addition, the hydraulic control device 50 includes: a lock-up solenoid valve (linear solenoid valve) SLU that regulates the modulator pressure Pmod, for example, in accordance with the value of an applied current to generate a lock-up solenoid pressure Pslu; a lock-up control valve 51 that is actuated by the lock-up solenoid pressure Pslu from the lock-up solenoid valve SLU as a signal pressure and that regulates the secondary pressure Psec to generate a lock-up pressure Plup for the lock-up clutch 28; and a lock-up relay valve 52 that is actuated by the lock-up solenoid pressure Pslu from the lock-up solenoid valve SLU as a signal pressure and that allows and restricts supply of the lock-up pressure Plup from the lock-up control valve 51 to the engagement oil chamber 28a of the lock-up clutch 28.

In the embodiment, the lock-up solenoid valve SLU sets the lock-up solenoid pressure Pslu to a value of 0 (to generate no lock-up solenoid pressure Pslu) when the value of the applied current is relatively small. After the value of the applied current is increased to a certain degree, the lock-up solenoid valve SLU sets the lock-up solenoid pressure Pslu to be higher as the current value is larger. In addition, the lock-up control valve 51 sets the lock-up pressure Plup to be lower by decreasing the secondary pressure Psec, which is the source pressure, as the lock-up solenoid pressure Pslu is lower when the lock-up solenoid pressure Pslu is generated by the lock-up solenoid valve SLU. When the lock-up solenoid pressure Pslu is a lock-up engagement pressure Pl determined in advance or more, the lock-up control valve 51 outputs the secondary pressure Psec as it is as the lock-up pressure Plup. Further, the lock-up relay valve 52 is configured to supply a circulation pressure Pcir, which is regulated to be lower than the secondary pressure Psec, to the fluid transmission chamber 23a of the starting device 23 when the lock-up solenoid pressure Pslu is not supplied from the lock-up solenoid valve SLU, and to supply the circulation pressure Pcir to a fluid transmission chamber 23a and supply the lock-up pressure Plup from the lock-up control valve 51 to the engagement oil chamber 28a of the lock-up clutch 28 when the lock-up solenoid pressure Pslu is supplied from the lock-up solenoid valve SLU.

Consequently, when the lock-up solenoid pressure Pslu is not generated by the lock-up solenoid valve SLU, working oil (at the circulation pressure Pcir) is supplied from the lock-up relay valve 52 into the fluid transmission chamber 23a, and the working oil flows into an oil passage formed between the lock-up piston 280 and the front cover 18. In contrast, working oil (at the lock-up pressure Plup) is not supplied into the engagement oil chamber 28a, and thus the lock-up clutch 28 is disengaged without establishing lock-up. When the lock-up solenoid pressure Pslu generated by the lock-up solenoid valve SLU is supplied to the lock-up control valve 51 and the lock-up relay valve 52, on the other hand, working oil, that is, the circulation pressure Pcir, is supplied from the lock-up relay valve 52 into the fluid transmission chamber 23a, and the lock-up pressure Plup generated by the lock-up control valve 51 is supplied from the lock-up relay valve 52 to the engagement oil chamber 28a of the lock-up clutch 28. Thus, when the lock-up pressure Plup becomes higher than the circulation pressure Pcir, the lock-up piston 280 moves toward the front cover 18. When the lock-up solenoid pressure Pslu becomes equal to or more than the lock-up engagement pressure Pl and the lock-up pressure Plup coincides with the secondary pressure Psec, the lock-up clutch 28 is completely engaged to complete lock-up.

The plurality of linear solenoid valves, the lock-up solenoid valve SLU, other solenoid valves (on/off solenoid valves) (not illustrated), and so forth included in the hydraulic control device 50 discussed above are controlled by the speed change ECU 21. As illustrated in FIG. 2, a speed change control module 210 and a lock-up control module 211 are constructed as functional blocks in the speed change ECU 21 through cooperation between hardware such as the CPU, the ROM, and the RAM and software such as a control program installed in the ROM.

The speed change control module 210 acquires a target shift speed corresponding to the accelerator operation amount Acc (or the operation amount THR of the throttle valve 13) and the vehicle speed V from a speed change line diagram (not illustrated) determined in advance, and sets an engagement pressure command value for linear solenoid valves corresponding to clutches and brakes to be engaged along with a change from the current shift speed to the target shift speed and a disengagement pressure command value for linear solenoid valves corresponding to clutches and brakes to be disengaged along with a change from the current shift speed to the target shift speed. In addition, the speed change control module 210 sets a holding pressure command value for linear solenoid valves corresponding to clutches and brakes that are engaged during a change from the current shift speed to the target shift speed and after establishment of the target shift speed.

The lock-up control module 211 sets a hydraulic pressure command value Up for the lock-up solenoid valve SLU discussed above. When a lock-up condition determined in advance is met, the lock-up control module 211 sets the hydraulic pressure command value Up such that lock-up is executed by the lock-up clutch 28, and controls a drive circuit (not illustrated) such that a current that matches the hydraulic pressure command value Up is applied from an auxiliary battery (not illustrated) to a solenoid portion of the lock-up solenoid valve SLU. In addition, when a slip control execution condition determined in advance is met, the lock-up control module 211 executes slip control in which a rotational speed difference ΔN (slip speed) between the front cover 18 (engine 12) which serves as an input member and the input shaft 31 of the automatic transmission 30 is caused to coincide with a target slip speed u* that matches the state (vehicle state) of at least one of the automobile 10 and the engine 12 through half engagement of the lock-up clutch 28. By executing such slip control in locking up the lock-up clutch 28 (during starting), it is possible to favorably suppress generation of vibration due to torque fluctuations along with lock-up by gradually increasing the torque capacity of the lock-up clutch 28. By executing the slip control so as to cause the lock-up clutch 28 to slip during acceleration and deceleration of the automobile 10 and further during shifting, in addition, it is possible to improve the power transfer efficiency and the fuel efficiency of the engine 12 compared to a case where lock-up is not established while favorably suppressing generation of vibration due to torque fluctuations along with lock-up.

Next, the slip control for the lock-up clutch 28 in the automobile 10 will be described.

Figure 3:
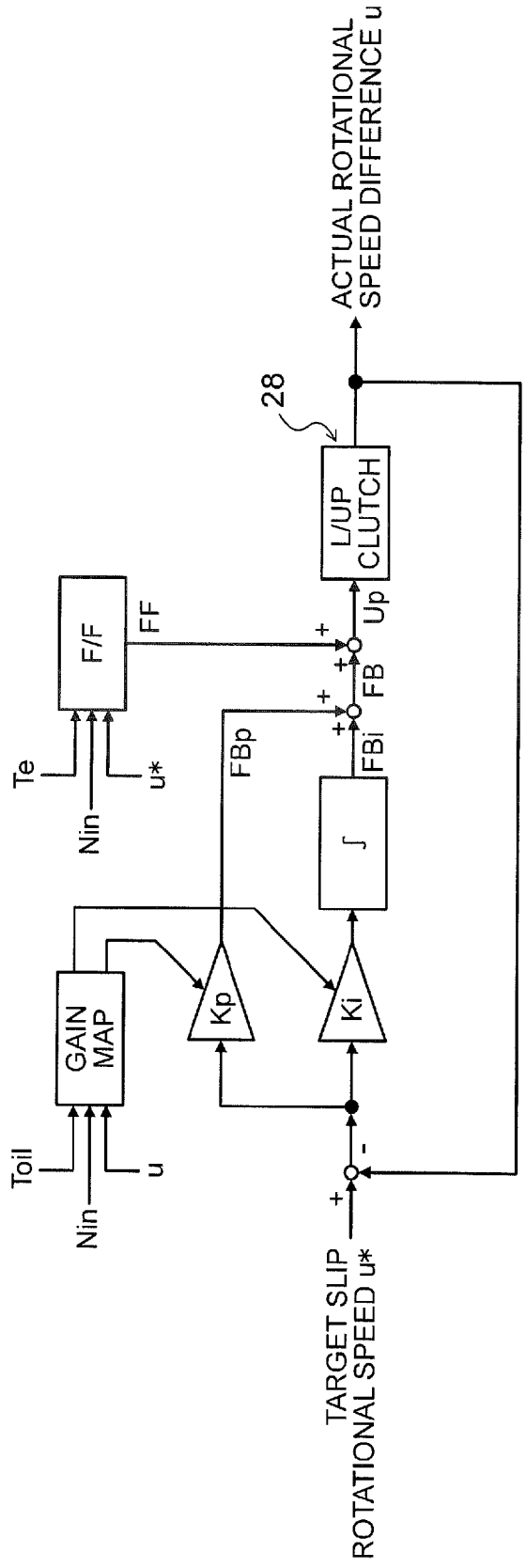
FIG. 3 is a control block diagram illustrating the procedure for setting a hydraulic pressure command value by a lock-up control module of a speed change as the lock-up clutch control device.

FIG. 3 is a control block diagram illustrating the procedure for setting the hydraulic pressure command value Up by the lock-up control module 211 of the speed change ECU 21. In executing the slip control, as illustrated in the drawing, the lock-up control module 211 sets a feedforward term FF of the hydraulic pressure command value Up on the basis of the engine torque Te, the input rotational speed Nin, and the target slip speed u*, for example. In addition, the lock-up control module 211 sets a feedback term FB of the hydraulic pressure command value Up including a proportional term FBp and an integral term FBi using a difference (u*−u) between the target slip speed u* and an actual slip speed u (=Ne−Nin) which is the difference in actual rotational speed (actual rotational speed difference) between the engine 12 (front cover 18) and the input shaft 31 of the automatic transmission 30, a proportional term gain Kp, and an integral term gain Ki. The feedback term FB of the hydraulic pressure command value UP may further include a differential term in addition to the proportional term FBp and the integral term FBi. Then, the lock-up control module 211 adds the feedforward term FF and the feedback term FB to each other to set the hydraulic pressure command value Up. In the embodiment, in this way, the speed change ECU 21 (lock-up control module 211) executes the slip control in which the actual slip speed u between the engine 12 and the input shaft 31 of the automatic transmission 30 is caused to coincide with the target slip speed u* using the hydraulic pressure command value Up including the feedback term FB which is set by relatively simple PI control (or PID control). Consequently, it is possible to significantly reduce the load of computation involving execution of the slip control.

Here, the inventors conducted diligent studies in order for the speed change ECU 21 (lock-up control module 211) discussed above to be able to execute the slip control stably and responsively in a wide execution region and in various vehicle states, and focused on the fact that reaction torque that matches the input rotational speed Nin and the rotational speed Ne of the engine 12 acts from the side of the input shaft 31 (turbine runner 25) against torque (power) transferred from the engine 12 to the front cover 18 during execution of the slip control. That is, when the slip control is executed in the starting device 23 which includes the lock-up clutch 28 and the torque converter which includes the pump impeller 24, the turbine runner 25, and the stator 26, and defining the capacity coefficient of the torque converter which matches the ratio in speed between the pump impeller 24 and the turbine runner 25 as "$C_T$" and defining the rotational angle speed of the input shaft 31 as "$\omega_i$", reaction torque $Tc=C_T \cdot \omega_i^2$ acts from the side of the input shaft 31, that is, the turbine runner 25 of the torque converter, on the pump impeller 24 as a reaction force against torque from the engine 12. In addition, defining a coefficient that matches the capacity coefficient $C_T$ as "$C_E$", and defining the rotational angle speed of the engine 12 (crankshaft 15) as "$\omega_e$", such reaction torque Tc can be represented as $Tc=C_E \cdot \omega_e^2$.

Similarly, also when the slip control is executed in a starting device including a lock-up clutch that serves as a hydraulic starting clutch and a fluid coupling including a pump impeller and a turbine runner (not including a stator), torque (reaction torque) at a value that is generally proportional to the square value of the rotational angle speed of the input shaft of the transmission or the engine acts on the pump impeller from the side of the turbine runner of the fluid coupling, that is, the side of the input shaft of the transmission, as a reaction force against torque from the engine. Also in the case where a lock-up clutch is combined with only a damper mechanism or used singly (not combined with a fluid transmission device such as a torque converter), torque (reaction torque) at a value that is generally proportional to the square value of the rotational angle speed of the input shaft of the transmission or the engine acts on an input member connected to the engine (crankshaft) as a reaction force against torque from the engine from the side of the input shaft of the transmission in executing the slip control.

Then, as a result of the studies, the inventors found that the amount of variations in the hydraulic pressure command value Up required to vary the actual slip speed u by a certain amount fluctuates in accordance with fluctuations in the reaction torque Tc which acts from the side of the input shaft 31 against torque from the engine 12, that is, fluctuations in the input rotational speed Nin or the rotational speed Ne of the engine 12. That is, when the actual slip speed u is kept constant through the slip control, a torque capacity $T_{LU}$ of the lock-up clutch, the torque Te of the engine 12, and the reaction torque Tc establish the relationship $Te=-T_{LU}-Tc$. In addition, the reaction torque Tc which acts from the side of the input shaft 31 against torque from the engine 12 is generally proportional to the square value of the rotational angle speed $\omega_i$ of the input shaft 31 or the engine 12 as discussed above, and is larger as the rotational speed of the input shaft 31 or the engine 12 is higher. Thus, as the rotational speed of the input shaft 31 or the engine 12 is higher, the amount of variations in the torque capacity $T_{LU}$ of the lock-up clutch 28 required to vary the actual slip speed u by a certain amount through the slip control is larger. Therefore, in order to vary the actual slip speed u by a certain amount through the slip control, it is necessary to increase the amount of variations in the hydraulic pressure command value Up as the input rotational speed Nin at the time of execution of the slip control is higher.

Figure 4:
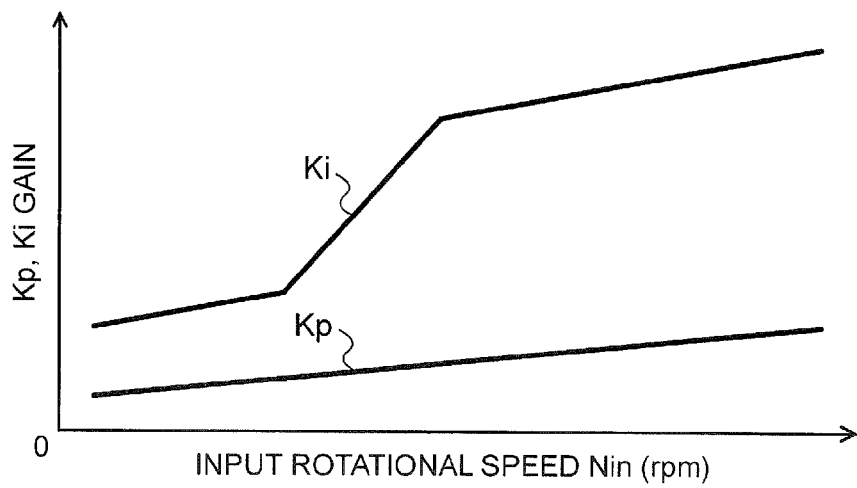
FIG. 4 illustrates an example of the relationship between an input rotational speed of an automatic transmission and a proportional term gain and an integral term gain.

In the embodiment, in the light of this, the lock-up control module 211 of the speed change ECU 21 is configured to change the proportional term gain Kp and the integral term gain Ki of the feedback term FB in accordance with the input rotational speed Nin. Specifically, the lock-up control module 211 is configured to set each of the proportional term gain Kp and the integral term gain Ki to a larger value as the input rotational speed Nin is higher as illustrated in FIG. 4. Consequently, it is possible to improve the stability of the slip control by suppressing abrupt engagement of the lock-up clutch 28 in the case where the input rotational speed Nin is relatively low, and to improve the response of the lock-up clutch 28 to the hydraulic pressure command value Up in the case where the input rotational speed Nin is relatively high.

In the course of the studies discussed above, in addition, the inventors also focused on the oil temperature Toil of working oil that actuates the lock-up clutch 28 in executing the slip control. Then, the inventors found that the amount of variations in the hydraulic pressure command value Up required to vary the actual slip speed u by a certain amount also fluctuates in accordance with fluctuations in the oil temperature Toil. That is, as the oil temperature Toil of working oil is higher, the friction coefficient (coefficient of kinetic friction) of the friction material of the lock-up clutch 28 is smaller because of a reduction in the viscosity of the working oil. Therefore, as the oil temperature Toil of working oil is higher, the amount of variations in the friction force, that is, the torque capacity $T_{LU}$, of the lock-up clutch 28 at the time when the hydraulic pressure command value Up is varied by a certain amount is smaller, and accordingly the amount of variations in the actual slip speed u at the time when the hydraulic pressure command value Up is varied by a certain amount is also smaller. Thus, in order to vary the actual slip speed u by a certain amount through the slip control, it is necessary to increase the amount of variations in the hydraulic pressure command value Up as the oil temperature Toil at the time of execution of the slip control is higher.

Figure 5:
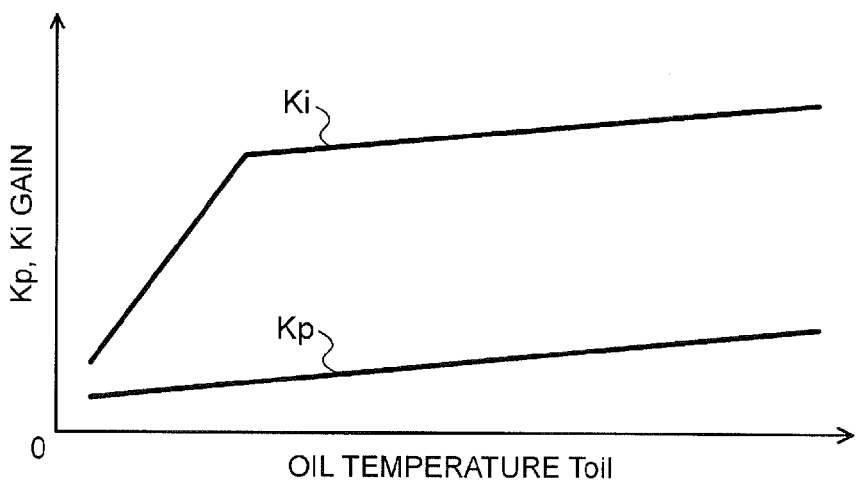
FIG. 5 illustrates an example of the relationship between an oil temperature and the proportional term gain and the integral term gain.

In the embodiment, in the light of this, the lock-up control module 211 of the speed change ECU 21 is further configured to change the proportional term gain Kp and the integral term gain Ki of the feedback term FB in accordance with the oil temperature Toil of working oil. Specifically, the lock-up control module 211 is configured to set each of the proportional term gain Kp and the integral term gain Ki to a larger value as the oil temperature Toil is higher as illustrated in FIG. 5. Consequently, it is possible to improve the stability of the slip control by suppressing abrupt engagement of the lock-up clutch 28 due to an increase in the friction coefficient (coefficient of kinetic friction) of the lock-up clutch 28 due to an increase in the viscosity of working oil in the case where the oil temperature Toil is relatively low, and to improve the response of the lock-up clutch 28 to the hydraulic pressure command value Up in the case where the oil temperature Toil is relatively high.

In the course of the studies discussed above, further, the inventors also focused on the actual slip speed (actual rotational speed difference) u itself between the engine 12 and the input shaft 31 of the automatic transmission 30 at the time of execution of the slip control. Then, the inventors found that the amount of variations in the hydraulic pressure command value Up required to vary the actual slip speed u by a certain amount also fluctuates in accordance with the actual slip speed u itself. That is, as the actual slip speed u between the engine 12 and the input shaft 31 of the automatic transmission 30 is lower, the friction coefficient (coefficient of kinetic friction) of the friction material of the lock-up clutch 28 is smaller. Therefore, as the actual slip speed u is lower, the amount of variations in the friction force, that is, the torque capacity $T_{LU}$, of the lock-up clutch 28 at the time when the hydraulic pressure command value Up is varied by a certain amount is smaller, and accordingly the amount of variations in the actual slip speed u at the time when the hydraulic pressure command value Up is varied by a certain amount is also smaller. Thus, in order to vary the actual slip speed u by a certain amount through the slip control, it is necessary to increase the amount of variations in the hydraulic pressure command value Up as the actual slip speed u at the time of execution of the slip control is lower.

Figure 6:
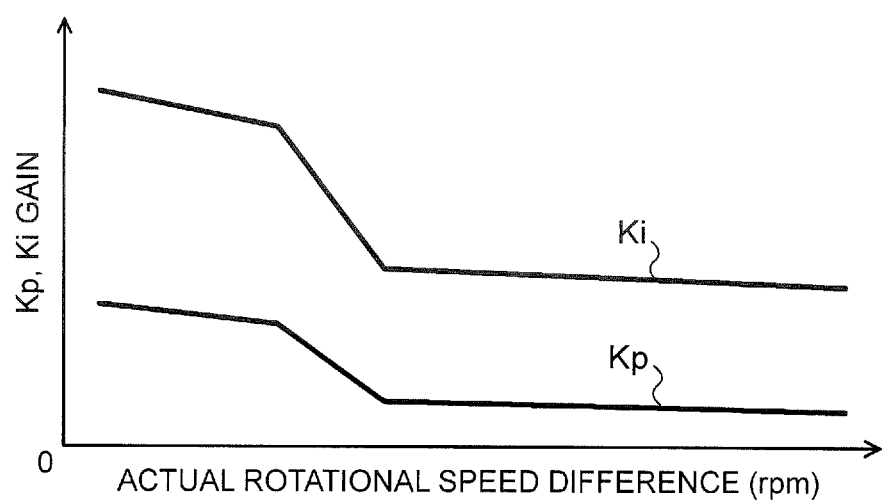
FIG. 6 illustrates an example of the relationship between an actual slip speed between an engine and an input shaft of the automatic transmission and the proportional term gain and the integral term gain.

In the embodiment, in the light of this, the lock-up control module 211 of the speed change ECU 21 is further configured to change the proportional term gain Kp and the integral term gain Ki of the feedback term FB in accordance with the actual slip speed u between the engine 12 and the input shaft 31. Specifically, the lock-up control module 211 is configured to set each of the proportional term gain Kp and the integral term gain Ki to a larger value as the actual slip speed u is lower as illustrated in FIG. 6. Consequently, it is possible to improve the delay in response of the lock-up clutch 28 due to a reduction in the friction coefficient (coefficient of kinetic friction) of the lock-up clutch 28 in the case where the actual slip speed u is relatively low, and to improve the stability of the slip control by suppressing abrupt engagement of the lock-up clutch 28 in the case where the actual slip speed u is relatively high.

Figure 7:
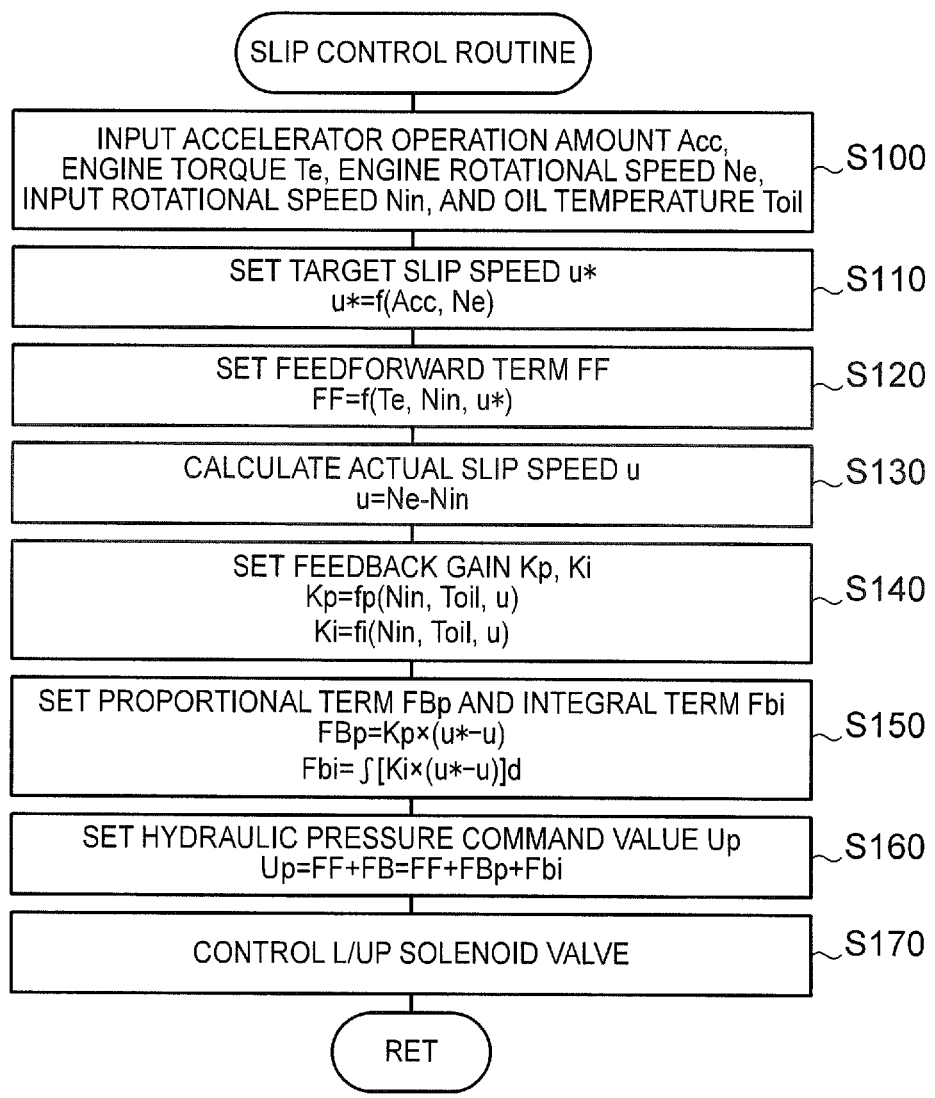
FIG. 7 is a flowchart illustrating an example of a slip control routine executed by the lock-up control module.

FIG. 7 is a flowchart illustrating an example of a slip control routine executed by the lock-up control module 211.

The slip control routine illustrated in the drawing is executed repeatedly at intervals of a predetermined time by the lock-up control module 211 when the lock-up clutch 28 is caused to slip along with establishment of the slip control execution condition. When the slip control routine of FIG. 7 is started, the lock-up control module 211 (CPU) executes an input process for data required for control such as the accelerator operation amount Acc from the accelerator pedal position sensor 92, the engine torque Te and the rotational speed Ne of the engine 12 from the engine ECU 14, the input rotational speed Nin from the rotational speed sensor 33, and the oil temperature Toil from the oil temperature sensor 55 (the temperature of working oil for the lock-up clutch 28) (step S100).

After the input process in step S100, the lock-up control module 211 sets the target slip speed u* corresponding to the accelerator operation amount Acc and the rotational speed Ne of the engine 12 (vehicle state) input in step S100 (step S110). In the embodiment, the relationship between the accelerator operation amount Acc and the rotational speed Ne of the engine 12 and the target slip speed u* has been determined in advance and stored in the ROM of the speed change ECU 21 as a target slip speed setting map (not illustrated), for example. Then, in step S110, the target slip speed u* corresponding to the given accelerator operation amount Acc and rotational speed Ne is derived from the target slip speed setting map and set. The target slip speed u* may be set on the basis of the operation amount THR of the throttle valve 13 and the rotational speed Ne, may be set further on the basis of another parameter in addition to the accelerator operation amount Acc and the rotational speed Ne, or may be set on the basis of parameters other than the accelerator operation amount Acc and the rotational speed Ne.

After the target slip speed u* is set in step S110, the lock-up control module 211 sets the feedforward term FF of the hydraulic pressure command value Up on the basis of the engine torque Te, the input rotational speed Nin, and the target slip speed u*, for example (step S120). In the embodiment, the relationship between the engine torque Te, the input rotational speed Nin, and the target slip speed u* and the feedforward term FF has been determined in advance and stored in the ROM of the speed change ECU 21 as a feedforward term setting map (not illustrated), for example. Then, in step S120, a value of the feedforward term FF corresponding to the given engine torque Te, input rotational speed Nin, and target slip speed u* is derived from the feedforward term setting map. The feedforward term FF may be set further on the basis of another parameter in addition to the engine torque Te, the input rotational speed Nin, and the target slip speed u*, or may be set on the basis of parameters other than the engine torque Te, the input rotational speed Nin, and the target slip speed u*. Further, the lock-up control module 211 calculates the actual slip speed u by subtracting the input rotational speed Nin from the rotational speed Ne of the engine 12 input in step S100 (step S130).

Then, the lock-up control module 211 sets the proportional term gain Kp and the integral term gain Ki of the feedback term FB on the basis of the input rotational speed Nin and the oil temperature Toil input in step S100 and the actual slip speed u calculated in step S130 (step S140). In the embodiment, the relationship between the input rotational speed Nin, the oil temperature Toil, and the actual slip speed u and the proportional term gain Kp has been determined in advance and stored in the ROM of the speed change ECU 21 as a proportional term gain setting map. Similarly, the relationship between the input rotational speed Nin, the oil temperature Toil, and the actual slip speed u and the integral term gain Ki has been determined in advance and stored in the ROM of the speed change ECU 21 as an integral term gain setting map. Then, in step S140, a value corresponding to the given input rotational speed Nin, oil temperature Toil, and actual slip speed u is derived from the proportional term gain setting map to be set as the proportional term gain Kp, and a value corresponding to the given input rotational speed Nin, oil temperature Toil, and actual slip speed u is derived from the integral term gain setting map to be set as the integral term gain Ki.

Figure 8:
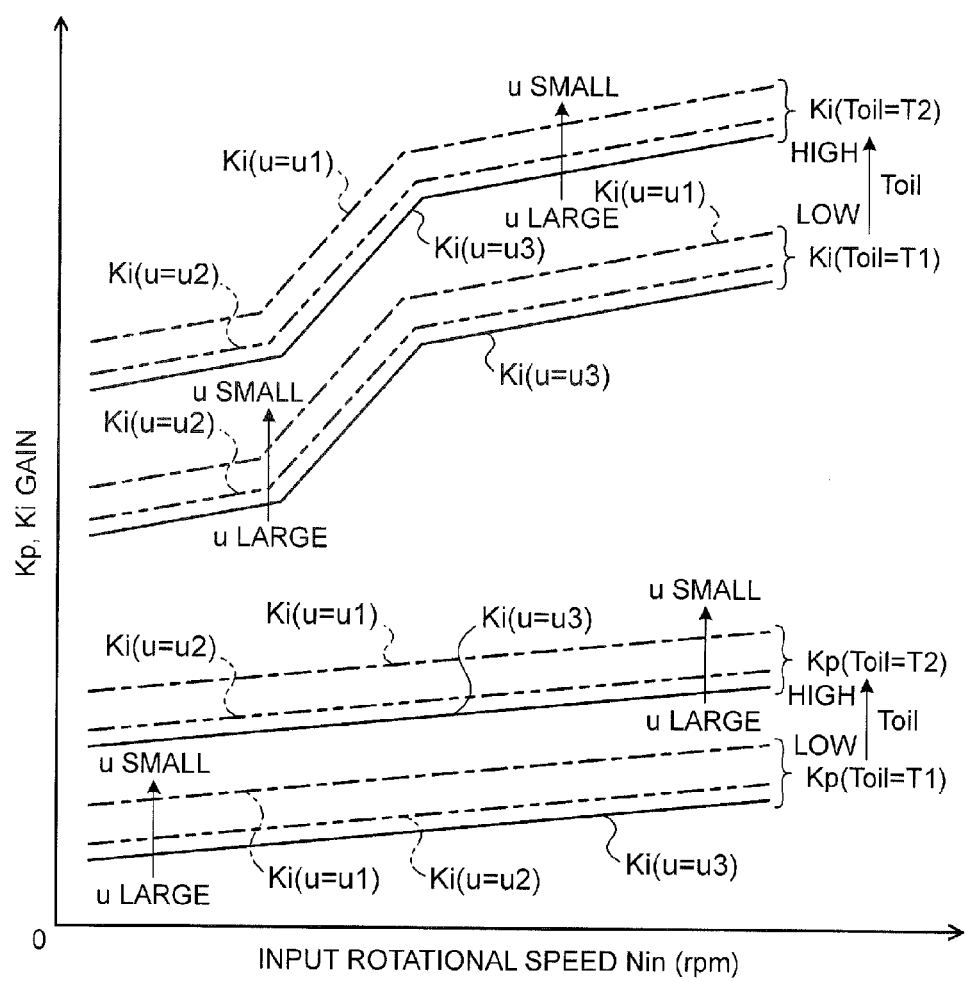
FIG. 8 illustrates an example of a proportional term gain setting map and an integral term gain setting map.

FIG. 8 illustrates an example of the proportional term gain setting map and the integral term gain setting map. The proportional term gain setting map is prepared by prescribing the relationship between the input rotational speed Nin and the proportional term gain Kp for each of a plurality of oil temperatures Toil (in the example of FIG. 8, temperatures T1 and T2 (T2>T1), e.g. T1=60 to 80° and T2=100 to 1200) and each of a plurality of actual slip speeds u (in the example of FIG. 8, actual slip speeds u1, u2, and u3 (u1<u2<u3), e.g. u1=10 to 30 rpm, u2=40 to 60 rpm, and u3=80 to 100 rpm), for example, on the basis of the relationship between the input rotational speed Nin and the proportional term gain Kp illustrated in FIG. 4, the relationship between the oil temperature Toil and the proportional term gain Kp illustrated in FIG. 5, and the relationship between the actual slip speed u and the proportional term gain Kp illustrated in FIG. 6. That is, in the embodiment, the proportional term gain setting map is prepared such that the proportional term gain Kp is larger (smaller) as the input rotational speed Nin is higher (lower), the proportional term gain Kp is larger (smaller) as the oil temperature Toil is higher (lower), and the proportional term gain Kp is larger (smaller) as the actual slip speed u is lower (higher).

In addition, the integral term gain setting map is prepared by prescribing the relationship between the input rotational speed Nin and the integral term gain Ki for each of a plurality of oil temperatures Toil (in the example of FIG. 8, the temperatures T1 and T2) and each of a plurality of actual slip speeds u (in the example of FIG. 8, the actual slip speeds u1, u2, and u3), for example, on the basis of the relationship between the input rotational speed Nin and the integral term gain Ki illustrated in FIG. 4, the relationship between the oil temperature Toil and the integral term gain Ki illustrated in FIG. 5, and the relationship between the actual slip speed u and the integral term gain Ki illustrated in FIG. 6. That is, in the embodiment, the integral term gain setting map is prepared such that the integral term gain Ki is larger (smaller) as the input rotational speed Nin is higher (lower), the integral term gain Ki is larger (smaller) as the oil temperature Toil is higher (lower), and the integral term gain Ki is larger (smaller) as the actual slip speed u is lower (higher).

In the case where the proportional term gain setting map and the integral term gain setting map illustrated in FIG. 8 are used, and in the case where the oil temperature Toil and the actual slip speed u input in step S100 do not coincide with the temperatures T1 and T2 and the actual slip speeds u1 to u3 in FIG. 8, the proportional term gain Kp and the integral term gain Ki are set by performing a linear interpolation between a plurality of values derived from the proportional term gain setting map and the integral term gain setting map in step S140. As a matter of course, the proportional term gain setting map and the integral term gain setting map may be prepared with the intervals of the oil temperature Toil and the actual slip speed u narrower than those illustrated in FIG. 8.

After the proportional term gain Kp and the integral term gain Ki are set in step S140, the proportional term FBp of the feedback term FB is set to a value obtained by multiplying the difference (u*−u) between the target slip speed u* and the actual slip speed u (=Ne−Nin) by the proportional term gain Kp, and the integral term FBi of the feedback term FB is set to a value obtained by multiplying the difference (u*−u) by the integral term gain Ki (step S150). Further, the lock-up control module 211 sets the hydraulic pressure command value Up to a value obtained by adding the proportional term FBp and the integral term FBi set in step S140, that is, the feedback term FB, to the feedforward term FF set in step S120 (step S160). Then, the lock-up control module 211 controls a drive circuit (not illustrated) that sets a current for the solenoid portion of the lock-up solenoid valve SLU on the basis of the hydraulic pressure command value Up (step S170). After that, when the next timing to execute the routine arrives, the lock-up control module 211 executes the processes in and after step S100 again.

As described above, the speed change ECU 21 (lock-up control module 211) which is the control device for the lock-up clutch 28 which constitutes the starting device 23 together with the torque converter which includes the pump impeller 24, the turbine runner 25, and the stator 26 sets the feedback term FB of the hydraulic pressure command value Up which includes at least the proportional term FBp and the integral term FBi using at least the difference (u*−u) between the target slip speed u* and the actual slip speed (actual rotational speed difference) u, the proportional term gain Kp, and the integral term gain Ki (step S150 of FIG. 7), and executes the slip control in which the actual slip speed u which is the actual rotational speed difference between the engine 12 and the input shaft 31 of the automatic transmission 30 is caused to coincide with the target slip speed u* using the hydraulic pressure command value Up which includes the feedback term FB (steps S160 and S170 of FIG. 7). Then, the speed change ECU 21 acquires the input rotational speed (rotational speed of the input shaft 31) Nin of the automatic transmission 30 in executing the slip control (step S100 of FIG. 7), and changes the proportional term gain Kp and the integral term gain Ki in accordance with fluctuations in the input rotational speed Nin by setting the proportional term gain Kp and the integral term gain Ki on the basis of the input rotational speed Nin (step S140 of FIG. 7). Consequently, it is possible to adequately set the hydraulic pressure command value Up such that a desired actual slip speed u can be obtained by individually bringing the proportional term gain Kp and the integral term gain Ki to values that match the input rotational speed Nin even if the input rotational speed Nin of the automatic transmission 30 fluctuates in executing the slip control. Thus, with the starting device 23 which includes the lock-up clutch 28, it is possible to execute the slip control stably and responsively in a wide execution region, that is, in a wide rotational speed range.

In the embodiment described above, in addition, each of the proportional term gain Kp and the integral term gain Ki is set to a larger value as the input rotational speed Nin of the automatic transmission 30 is higher (to a smaller value as the input rotational speed Nin is lower) (step S140 of FIG. 7, FIG. 4, and FIG. 8). Consequently, it is possible to improve the stability of the slip control by suppressing abrupt engagement of the lock-up clutch 28 in the case where the input rotational speed Nin is relatively low, and to improve the response of the lock-up clutch 28 to the hydraulic pressure command value Up in the case where the input rotational speed Nin is relatively high.

Then, in the case where the lock-up clutch 28 is combined with the torque converter which includes the pump impeller 24, the turbine runner 25, and the stator 26, the reaction torque Tc which acts from the side of the input shaft 31 (turbine runner 25) against torque from the engine 12 in executing the slip control is particularly large. Thus, changing the proportional term gain Kp and the integral term gain Ki in accordance with the input rotational speed Nin as discussed above in executing the slip control for the lock-up clutch 28 which constitutes the starting device 23 together with the torque converter which includes the pump impeller 24, the turbine runner 25, and the stator 26 is extremely useful to execute the slip control stably and responsively in a wide execution region and in various vehicle states. It should be noted, however, that the reaction torque Tc which acts from the input shaft 31 (the side of the turbine runner 25) against torque from the engine 12 can be represented using the rotational speed Ne of the engine 12 as discussed above. Thus, as a matter of course, the proportional term gain Kp and the integral term gain Ki may be changed in accordance with the rotational speed Ne of the engine 12 which is correlated with the input rotational speed Nin, instead of changing the proportional term gain Kp and the integral term gain Ki in accordance with the input rotational speed Nin as in the embodiment described above.

Further, the speed change ECU 21 acquires the oil temperature Toil of working oil that actuates the lock-up clutch 28 in executing the slip control (step S100 of FIG. 7), and changes the proportional term gain Kp and the integral term gain Ki in accordance with fluctuations in the oil temperature Toil by setting the proportional term gain Kp and the integral term gain Ki further on the basis of the oil temperature Toil, not only the input rotational speed Nin (step S140 of FIG. 7). Consequently, by individually bringing the proportional term gain Kp and the integral term gain Ki to values that match the oil temperature Toil even if the oil temperature Toil of working oil varies in executing the slip control, it is possible to adequately set the hydraulic pressure command value Up such that a desired actual slip speed u can be obtained, which makes it possible to execute the slip control stably and responsively in various situations.

In the embodiment described above, in addition, each of the proportional term gain Kp and the integral term gain Ki is set to a larger value as the oil temperature Toil of working oil is higher (step S140 of FIG. 7, FIG. 5, and FIG. 8). Consequently, it is possible to improve the stability of the slip control by suppressing abrupt engagement of the lock-up clutch 28 in the case where the oil temperature Toil is relatively low, and to improve the response of the lock-up clutch 28 to the hydraulic pressure command value Up in the case where the oil temperature Toil is relatively high.

Further, the speed change ECU 21 calculates the actual slip speed u in executing the slip control (step S130 of FIG. 7), and changes the proportional term gain Kp and the integral term gain Ki in accordance with fluctuations in the actual slip speed u by setting the proportional term gain Kp and the integral term gain Ki further on the basis of the actual slip speed u, not only the input rotational speed Nin and the oil temperature Toil (step S140 of FIG. 7). Consequently, by individually bringing the proportional term gain Kp and the integral term gain Ki to values that match the actual slip speed u when the actual slip speed u between the engine 12 and the input shaft 31 of the automatic transmission 30 varies along with execution of the slip control, it is possible to adequately set the hydraulic pressure command value Up such that a desired actual slip speed u can be obtained, which makes it possible to execute the slip control stably and responsively in various situations.

In the embodiment described above, in addition, each of the proportional term gain Kp and the integral term gain Ki is set to a larger value as the actual slip speed u is lower (step S140 of FIG. 7, FIG. 6, and FIG. 8). Consequently, it is possible to improve the delay in response of the lock-up clutch 28 in the case where the actual slip speed u is relatively low, and to improve the stability of the slip control by suppressing abrupt engagement of the lock-up clutch 28 in the case where the actual slip speed u is relatively high.

Further, the speed change ECU 21 has the proportional term gain setting map which prescribes the relationship between the input rotational speed Nin, the oil temperature Toil, and the actual slip speed u and the proportional term gain Kp, and the integral term gain setting map which prescribes the relationship between the input rotational speed Nin, the oil temperature Toil, and the actual slip speed u and the integral term gain Ki. Then, the speed change ECU 21 derives the proportional term gain Kp corresponding to the input rotational speed Nin, the oil temperature Toil, and the actual slip speed u from the proportional term gain setting map, and derives the integral term gain Ki corresponding to the input rotational speed Nin, the oil temperature Toil, and the actual slip speed u from the integral term gain setting map (step S140 of FIG. 7). Consequently, it is possible to individually bring the proportional term gain Kp and the integral term gain Ki to adequate values that match the input rotational speed Nin, the oil temperature Toil, and the actual slip speed u, which makes it possible to set the hydraulic pressure command value Up extremely adequately such that a desired actual slip speed u can be obtained. It should be noted, however, that the reaction torque Tc which acts from the input shaft 31 (the side of the turbine runner 25) against torque from the engine 12 can be represented using the rotational speed Ne of the engine 12 as discussed above. Thus, as a matter of course, the proportional term gain setting map may be prepared so as to prescribe the relationship between the rotational speed Ne of the engine 12, the oil temperature Toil, and the actual slip speed u and the proportional term gain Kp, and the integral term gain setting map may be prepared so as to prescribe the relationship between the rotational speed Ne, the oil temperature Toil, and the actual slip speed u and the integral term gain Ki.

In addition, by individually setting the proportional term gain Kp and the integral term gain Ki of the feedback term FB of the hydraulic pressure command value Up in accordance with the input rotational speed Nin, the oil temperature Toil, and the actual slip speed u as in the embodiment described above, it is possible to adequately set the hydraulic pressure command value such that a desired actual rotational speed difference can be obtained, and to immediately converge the actual slip speed u to the target slip speed u*. Further, the proportional term gain Kp and the integral term gain Ki may be set using a three-dimensional map in which the input rotational speed Nin, the oil temperature Toil, and the actual slip speed u are defined by the X axis, the Y axis, and the Z axis, respectively, for example. It should be noted, however, that only the integral term gain Ki may be set in accordance with at least one of the input rotational speed Nin, the oil temperature Toil, and the actual slip speed u, instead of individually setting the proportional term gain Kp and the integral term gain Ki in accordance with the input rotational speed Nin etc.

In the embodiment described above, the lock-up clutch 28 constitutes the starting device 23 together with the pump impeller 24 coupled to the engine 12 and the turbine runner 25 coupled to the input shaft 31 of the automatic transmission 30, and couples and decouples the engine 12 (front cover 18) and the input shaft 31 to and from each other. However, application of the present disclosure is not limited thereto. That is, the present disclosure may also be applied to a hydraulic starting clutch combined with only a damper mechanism, or a hydraulic starting clutch that is used singly (not combined with a fluid transmission device such as a torque converter and a fluid coupling). Thus, the starting device 23 discussed above may not be provided with the pump impeller 24, the turbine runner 25, and the stator 26, and even the damper mechanism 27.

The correspondence between the main elements of the embodiment described above and the main elements of the disclosure described in the "SUMMARY" section does not limit the elements of the disclosure described in the "SUMMARY" section, because the embodiment described above is an example given for the purpose of specifically describing modes for carrying out the disclosure described in the "SUMMARY" section. That is, the embodiment described above is merely a specific example of the disclosure described in the "SUMMARY" section, and any interpretation of the disclosure described in the "SUMMARY" section should be construed on the basis of the description in that section.

While an embodiment of the present disclosure has been described above, it is a matter of course that the present disclosure is not limited to the embodiment described above in any way, and that the present disclosure may be modified in various ways without departing from the scope and sprit of the present disclosure.

INDUSTRIAL APPLICABILITY

The present disclosure can be utilized in the manufacturing industry for a lock-up clutch and a starting device including the lock-up clutch.

The invention claimed is:

1. A lock-up clutch control device that sets a hydraulic pressure command value for a lock-up clutch as a starting device together with a pump impeller coupled to a motor of a vehicle and a turbine runner coupled to an input shaft of a transmission such that an actual rotational speed difference between the motor and the input shaft coincides with a target slip speed that matches a state of the vehicle, and controls the lock-up clutch based on the hydraulic pressure command value, the lock-up clutch control device comprising:

an electronic control unit that is programmed to:
  acquire a rotational speed of the input shaft;
  acquire a temperature of working oil that actuates the lock-up clutch, and
  set a feedback term of the hydraulic pressure command value including at least a proportional term and an integral term using at least a difference between the target slip speed and the actual rotational speed difference, a proportional term gain, and an integral term gain, wherein
at least the integral term gain is changed in accordance with the rotational speed of the input shaft,
an ascending inclination of the integral term gain when the rotational speed of the input shaft is higher is larger than an ascending inclination of the integral term gain when the rotational speed of the input shaft is lower,
at least the integral term gain is set to a larger value as the rotational speed of the input shaft is higher, and
at least the integral term gain is further changed in accordance with the temperature of the working oil.

2. The lock-up clutch control device according to claim 1, wherein
an ascending inclination of the integral term gain when the temperature of the working oil is lower is larger than an ascending inclination of the integral term gain when the temperature of the working oil is higher, and
at least the integral term gain is set to a larger value as the temperature of the working oil is higher.

3. The lock-up clutch control device according to claim 1, wherein
at least the integral term gain is further changed in accordance with the actual rotational speed difference.

4. The lock-up clutch control device according to claim 3, wherein
a descending inclination of the integral term gain when the actual rotational speed difference is larger is larger than a descending inclination of the integral term gain when the actual rotational speed difference is smaller, and
at least the integral term gain is set to a larger value as the actual rotational speed difference is smaller.

5. The lock-up clutch control device according to claim 1, wherein an ascending inclination of the proportional term gain in accordance with the rotational speed of the input shaft is constant.

6. The lock-up clutch control device according to claim 2, wherein an ascending inclination of the proportional term gain in accordance with the temperature of the working oil is constant.

7. The lock-up clutch control device according to claim 2, wherein
at least the integral term gain is further changed in accordance with the actual rotational speed difference.

8. The lock-up clutch control device according to claim 7, wherein
a descending inclination of the integral term gain when the actual rotational speed difference is large is larger than a descending inclination of the integral term gain when the actual rotational speed difference is small, and
at least the integral term gain is set to a larger value as the actual rotational speed difference is smaller.

9. The lock-up clutch control device according to claim 8, wherein
each of the integral term gain and the proportional term gain is changed in accordance with the rotational speed of the input shaft.

10. The lock-up clutch control device according to claim 9, wherein
the electronic control unit includes a proportional term gain setting map that prescribes a relationship between the rotational speed of the input shaft, the temperature of the working oil, and the actual rotational speed difference and the proportional term gain and an integral term gain setting map that prescribes a relationship between the rotational speed of the input shaft, the temperature of the working oil, and the actual rotational speed difference and the integral term gain, and derives the proportional term gain corresponding to the rotational speed of the input shaft, the temperature of the working oil, and the actual rotational speed difference from the proportional term gain setting map, and derives the integral term gain corresponding to the rotational speed of the input shaft, the temperature of the working oil, and the actual rotational speed difference from the integral term gain setting map.

11. The lock-up clutch control device according to claim 10, wherein
the pump impeller and the turbine runner constitute a torque converter together with a stator that rectifies a flow of the working oil from the turbine runner to the pump impeller.

12. A lock-up clutch control device that sets a hydraulic pressure command value for a lock-up clutch as a starting device together with a pump impeller coupled to a motor of a vehicle and a turbine runner coupled to an input shaft of a transmission such that an actual rotational speed difference between the motor and the input shaft coincides with a target slip speed that matches a state of the vehicle, and that controls the lock-up clutch based on the hydraulic pressure command value, the lock-up clutch control device comprising:
an electronic control unit that is programmed to:
acquire a rotational speed of the input shaft; and
set a feedback term of the hydraulic pressure command value including at least a proportional term and an integral term using at least a difference between the target slip speed and the actual rotational speed difference, a proportional term gain, and an integral term gain, wherein
at least the integral term gain is changed in accordance with the rotational speed of the input shaft,
an ascending inclination of the integral term gain when the rotational speed of the input shaft is higher is larger than an ascending inclination of the integral term gain when the rotational speed of the input shaft is lower,
at least the integral term gain is set to a larger value as the rotational speed of the input shaft is higher,
at least the integral term gain is further changed in accordance with the actual rotational speed difference,
a descending inclination of the integral term gain when the actual rotational speed difference is larger is larger than a descending inclination of the integral term gain when the actual rotational speed difference is smaller, and
at least the integral term gain is set to a larger value as the actual rotational speed difference is smaller.

13. A lock-up clutch control device that sets a hydraulic pressure command value for a lock-up clutch as a starting device together with a pump impeller coupled to a motor of a vehicle and a turbine runner coupled to an input shaft of a transmission such that an actual rotational speed difference between the motor and the input shaft coincides with a target slip speed that matches a state of the vehicle, and that controls the lock-up clutch based on the hydraulic pressure command value, the lock-up clutch control device comprising:
an electronic control unit that is programmed to:
acquire a rotational speed of the input shaft; and
set a feedback term of the hydraulic pressure command value including at least a proportional term and an integral term using at least a difference between the target slip speed and the actual rotational speed difference, a proportional term gain, and an integral term gain, wherein
at least the integral term gain is changed in accordance with the rotational speed of the input shaft,
an ascending inclination of the integral term gain when the rotational speed of the input shaft is higher is larger than an ascending inclination of the integral term gain when the rotational speed of the input shaft is lower,
at least the integral term gain is set to a larger value as the rotational speed of the input shaft is higher, and
the ascending inclination in a low rotational speed range and the ascending inclination in a high rotational speed range are uniform respectively.

* * * * *